Aug. 11, 1959   D. T. GEISER   2,899,654
VARIABLE INDUCTANCE DEVICE
Filed Aug. 10, 1954

INVENTOR.
DAVID T. GEISER
BY
HIS ATTORNEYS

United States Patent Office 2,899,654
Patented Aug. 11, 1959

2,899,654

VARIABLE INDUCTANCE DEVICE

David T. Geiser, North Adams, Mass., assignor to Sprague Electric Company, North Adams, Mass., a corporation of Massachusetts Application August 10, 1954, Serial No. 448,833

6 Claims. (Cl. 336—110)

This invention relates to inductance devices, the inductance of which may be varied as for example when the device is to be tuned for a particular application.

Among the objects of this invention is the provision of novel variable inductance devices that operate in an improved manner. It is a further object of the invention to produce a variable inductance device of simple construction which exhibits extremely low variation in Q with large changes in inductance. Further objects of the invention will become apparent from the following description.

These objects have been achieved in accordance with the present invention by the provision of a variable inductance device having a body of soft ferromagnetic material, self-inductance windings linked with said body, and bias flux generating means connected to move toward and from said body to induce adjustable amounts of bias flux in said body, said flux generating means being connected to automatically rotate as it moves toward and from said body to periodically reverse the direction of the bias flux in said body as this flux changes in magnitude.

In a more restricted sense, these objects have been achieved in accordance with the present invention by the production of a variable inductance device comprising a body of soft ferromagnetic material, a coil having self-inductance wound about said body, and a tuning element in the form of a permanent magnet rotatably mounted so that it automatically reverses its relative position periodically as it approaches and retreats from said body.

In a further limited embodiment the objects of this invention have been achieved by the production of a variable inductance device comprising a toroid of soft ferromagnetic material, a coil having self-inductance wound about said toroid, a permanently polarized barium ferrite magnet threadedly mounted to rotate and advance toward as well as move away from the toroid.

For a more complete understanding of this invention reference should now be made to the accompanying drawings in which.

Figure 1:
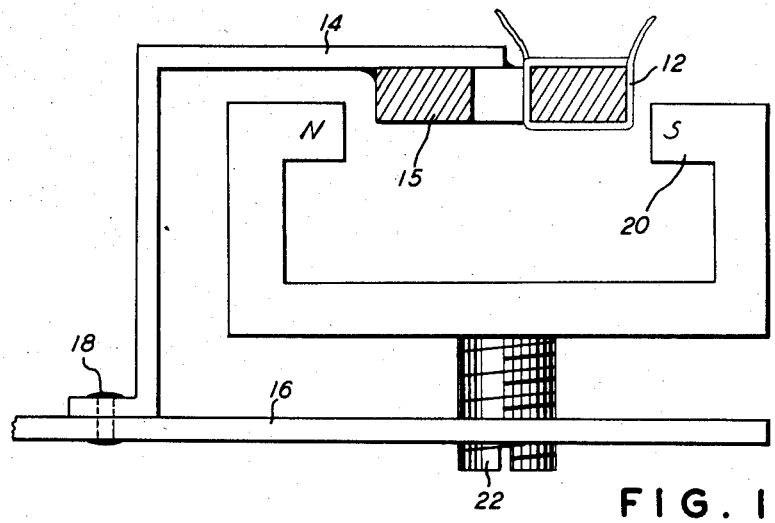
Fig. 1 shows a cross-section of one embodiment of the invention.

In Fig. 1 a toroid of soft ferromagnetic material 15 forms the body about which windings 12 are coiled. The ferromagnetic body 15 is glued or otherwise secured to a holder 14 which is in turn secured to a base 16 by screw or rivet means 18, or other suitable fastening structure. The holder 14 is of a non-magnetic material such as resin or brass. A rotatable permanent magnet 20 is, for high frequency applications, of permanently polarized barium ferrite. The permanent magnet 20 is of a U-shaped configuration threadedly mounted as by a threaded rod 22 which is threaded to the base 16. Variation in effective inductance of the windings 12 is accomplished by rotation of the permanent magnet. The base 16 can be secured directly to the chassis of the electronic equipments in which the device is used, or it can be part of the chassis. Additionally, the holder 14 can be part of or can be secured to the chassis as where the chassis is of magnetic or non-magnetic material. Where the chassis is of magnetic material the permanent magnet is magnetically removed from the soft magnetic material forming the core more rapidly as the magnet approaches the chassis than when the chassis is of non-magnetic material. With a holder 14 of electrically conductive material, it is desirable to have it engage as little of the core 15 as possible.

Figure 2:
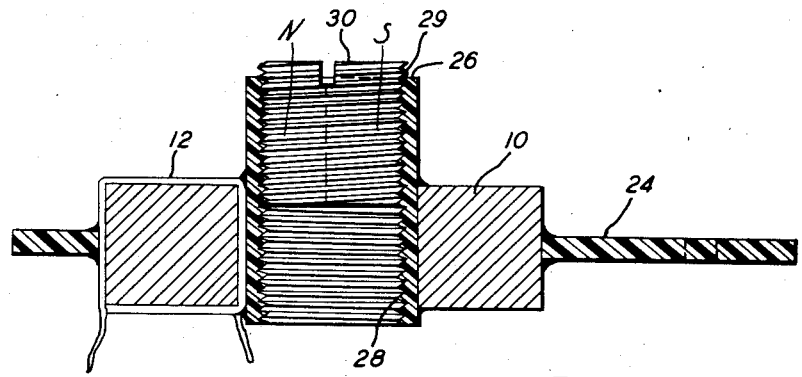
Fig. 2 is a cross-sectional view of an additional embodiment of this invention.

Referring now to Fig. 2, a toroidal ferromagnetic body 10 with windings 12 is secured to metallic or resin mounting bracket 24, which is in turn secured to or forms part of the chassis of the electronic equipment. Within the opening of the body 10 a carboard or resin tube 26 is positioned. The inner surface of the tube 26 has a threaded configuration 28 which cooperates with threads 29 on the surface of a generally rod-shaped permanent magnet 30. The permanent magnet 30 has its magnetic polarization perpendicular to its longitudinal axis so as to be divided into two solid hemicyclinders forming a north pole and a south pole respectively on the opposite sides of an imaginary plane dissecting the magnet 30 from top to bottom as indicated by the dotted line of Figure 2. The permanent magnet 30 has a north pole as indicated by N and a south pole as indicated by S in Figure 2 and is preferably arranged so that it can be completely withdrawn from and completely penetrated into the toroid 10.

The core materials used as the ferromagnetic body should be suitable for effective operation at the frequency of the signals that are to be carried by the windings. For low frequency operations, a laminated sheet iron core is suitable. For intermediate frequency operation, i.e. about 1 kilocycle to about 500 kilocycles per second, where high permeability is desired, powdered iron or powdered permalloy type compositions and even spiral tapes of permalloy, iron or the like, are best used, while for frequencies of 1 megacycle or higher, when the hysteresis losses in other core constructions is substantial, the non-metallic soft ferromagnetic ferrites are very effective. For maximum frequency operation, nickel ferrite is particularly desirable. By "soft" ferromagnetic materials is meant any such material which shows very little residual flux after removal from a magnetic field. These materials are ordinarily considered as not permanently magnetizable.

Although the residual flux in such material is quite low, it has been found to appreciably affect the operation of inductors. Inasmuch as a relatively small amount of flux is sufficient to greatly change the permeability of these materials, such residual flux reduces the range of possible inductance variation. In addition, the approach and withdrawal of a bias flux will usually result in a change in the amount of residual flux so that reproducibility of adjustment has previously been difficult to attain.

With the present invention, however, these difficulties are avoided. By reason of the fact that the externally applied bias flux reverses in direction periodically as the bias flux means is withdrawn from the soft magnetic core, this core is subjected to an alternating type of demagnetization which gives the highest order of reproducibility and which, when completed by a total withdrawal of the bias flux, leaves a core more completely demagnetized than has heretofore been considered possible.

By way of example, a nickel ferrite toroid having an outer diameter of $9/10''$, an inner diameter of 0.27", a cross-sectional area of 0.023 sq. inches, and an initial permeability of 8, was wound with twenty turns of #28 (American Wire Gauge) copper wire single Formex insulated, the turns extending uniformly around the toroid. This was fitted in an assembly of the type shown in Fig. 1 with a barium ferrite permanent magnet having air gaps totaling 0.1". The flux in the air gap, in maximum flux position, was approximately one kilogauss. Instead of having the entire U-shaped structure 20 made of the barium ferrite, only the tips on either side of the air gap around the toroid were of such permanently magnetized material. The above inductor, tested at 16 megacycles per second, showed an adjustment range of 24.1% away from the maximum, and a Q that varied from 193 at maximum inductance to 188 at minimum inductance.

For applications in which substantial voltages are imposed on the core material, suitable insulation of the core with a lacquer or varnish is desirable. The conductors which are wound about the cores in a way so as to exhibit self-inductance can be either insulated or non-insulated, depending on their particular application. The manner in which wire is wound about the toroid of Figs. 1 and 2 will affect the way the inductance varies as the permanent magnet is moved relative to the toroid. If a relatively constant change of inductance is desired, the winding should be uniformly distributed about the toroid. However, windings lumped in one place on the toroid, or in opposite locations, provide a larger inductance change per degree of rotation of the magnet 30.

For the inductors of the present invention, suitable permanently polarized magnets include carbon steel, tungsten steel, the various iron-cobalt-nickel-aluminum alloys, and ferrites such as barium ferrite.

The axis of rotation of the permanent magnet need not be in the geometric center of the permanent magnet but is positioned so as to be either eccentric or concentric without appreciably affecting the tuning. For best results, however, the axis of rotation for the permanent magnet should be perpendicularly located with respect to the plane defined by the pole pieces of the magnet. If the axis is out of the true from this perpendicular, then the residual magnet effects are not quite as low as the invention is capable of.

It is also unnecessary to have the pole pieces of the magnet directly oposite from each other. Instead of being 180° apart with respect to the rotation, the pole pieces can be adjusted at any desired angle with respect to each other. (In fact, one pole piece can be completely omitted so that only the other pole piece is effective to induce the desired bias flux.) However, higher bias fluxes can be more readily obtained with smaller permanent magnets if the only air gap in the bias magnetic circuit consists of the air gaps adjacent the winding-carrying core. Thus, by making the entire magnet 30 of permanently polarizable material, a magnet of much smaller cross-section can be used.

It should also be noted that the bias flux can be applied by any other type of flux-applying means such as an electro-magnet or solenoid.

Where lumped windings are used, there is a pronounced change of inductance within any 360° rotation of the biased flux. Inductance adjustment can accordingly be made by a small amount of rotation without any appreciable overall change of the bias flux concentration in the core that carries the windings.

In the construction of Fig. 2, for example, the tube 26 is made radially symmetrical and the magnet 30 is located eccentrically with respect to the core when a single lumped winding is used. This is the result of the space occupied by the winding.

The variable inductance and high Q is useful not only as a variable inductor per se in tuned circuits, but also as wave traps, transformer matching means, filters, and other similar devices. By variation of the various parameters, the inductance change per degree rotation can be tailored to a particular application.

What is claimed is:

1. A variable inductance system comprising a rotatable permanent magnet, a body of soft ferromagnetic material magnetized by said permanent magnet, self-inductance windings associated with said body, said permanent magnet being rotatable with relation to said body on an axis extending through said body, said axis being perpendicular to the polarization of said magnet poles, and means supporting said permanent magnet in rotatable relationship with respect to said body so as to permit incremental relative movement between said permanent magnet and said body whereby said permanent magnet generates a reversing D.C. bias flux in said body upon incremental rotation with respect to said body and produces adjustable amounts of D.C. bias flux in said body.

2. A system for producing a variable inductance comprising a body of soft magnetic material, a coil having a self-inductance wound about said body, an element movable toward and away from said body producing varying magnetization of said body, a permanent magnet on said movable element, pole pieces of said magnet on said movable element polarized perpendicular to the direction of movement of said permanent magnet producing a magnetic flux in said body, and means for rotating said element and said pole pieces relative to said body whereby a bias flux in said body is periodically reversed in direction by the rotation of said pole pieces, said means for rotating said element so constructed and arranged as to provide in said body adjustable amounts of bias flux with an absence of inherent magnetic hysteresis.

3. In a variable inductance system, a body of soft ferromagnetic material, a coil having self-inductance wound about said body, bias flux generating means for inducing adjustable amounts of bias flux in said body, said bias flux generating means comprising a rotatable permanent magnet, means for rotating said magnet to and from said body, pole pieces of said permanent magnet polarized perpendicular to the axis of said rotation and revolvable about said body, said revolvable pole pieces reversing the direction of the bias flux in said body upon rotation of said flux generating means whereby said body is magnetized and demagnetized and a state of complete demagnetization is produced upon the complete withdrawal of said pole pieces from adjacent said body.

4. The combination of claim 3 in which the body of soft ferromagnetic material is a toroid.

5. The variable inductance device of claim 3 wherein said coil is lump wound about said toroid.

6. The device of claim 3 wherein said coil is uniformly distributed about said toroid.

References Cited in the file of this patent

UNITED STATES PATENTS

| | | |
|---|---|---|
| 1,896,510 | Given | Feb. 7, 1933 |
| 2,363,101 | Van Der Heem | Nov. 21, 1944 |
| 2,503,155 | Harvey | Apr. 4, 1950 |
| 2,781,496 | Lathouwers | Feb. 12, 1957 |